US007843658B2

(12) United States Patent
Kiyono

(10) Patent No.: US 7,843,658 B2
(45) Date of Patent: Nov. 30, 2010

(54) METHOD FOR MEASURING MAGNETIC WRITE WIDTH IN DISCRETE TRACK RECORDING

(75) Inventor: Hiroshi Kiyono, Tokyo (JP)

(73) Assignee: TDK Corporation, Tokyo (JP)

( * ) Notice: Subject to any disclaimer, the term of this patent is extended or adjusted under 35 U.S.C. 154(b) by 219 days.

(21) Appl. No.: 12/146,838

(22) Filed: Jun. 26, 2008

(65) Prior Publication Data

US 2009/0323209 A1      Dec. 31, 2009

(51) Int. Cl.
G11B 27/36        (2006.01)
G11B 21/02        (2006.01)
(52) U.S. Cl. ..................... 360/31; 360/75; G9B/27.052
(58) Field of Classification Search ........................ None
See application file for complete search history.

(56) References Cited

U.S. PATENT DOCUMENTS

| 6,608,477 | B2 | 8/2003 | Sacks et al. | |
|---|---|---|---|---|
| 6,680,609 | B1 * | 1/2004 | Fang et al. | 324/210 |
| 6,801,377 | B2 | 10/2004 | Kasajima et al. | |
| 6,967,798 | B2 * | 11/2005 | Homola et al. | 360/48 |
| 7,119,537 | B2 | 10/2006 | Che et al. | |
| 2008/0158705 | A1 * | 7/2008 | Che et al. | 360/31 |

FOREIGN PATENT DOCUMENTS

| JP | A 2000-11336 | 1/2000 |
|---|---|---|
| JP | A 2003-6822 | 1/2003 |

OTHER PUBLICATIONS

Lin et al., "Full-Track Profile Derivative Method for Track Width Measurements of Magnetic Recording Head," *IEEE Transactions on Magnetics*, vol. 41. No. 10, Oct. 2005, pp. 3067-3069.

* cited by examiner

*Primary Examiner*—Daniell L Negrón
(74) *Attorney, Agent, or Firm*—Oliff & Berridge, PLC

(57) ABSTRACT

A method of measuring a magnetic write width includes forming a data track on a discrete track medium by a write operation at a first frequency, performing write operations at a second frequency that is different from the first frequency, at both side positions along the formed data track, obtaining a track profile by scanning the data track in a track-width direction, using a magnetic field detection element, calculating an integrated profile of the obtained track profile, obtaining profile integrals by setting a distance from the data track to a position of the write operations at the second frequency to various values and by calculating the profile integrals for the respective values of the distance, and calculating a magnetic write width of the magnetic head and a magnetic write width of the discrete track medium from a relationship between the distance and the profile integrals.

12 Claims, 11 Drawing Sheets

METHOD FOR MEASURING MAGNETIC WRITE WIDTH IN DISCRETE TRACK RECORDING

BACKGROUND OF THE INVENTION

1. Field of the Invention

The present invention relates to a method of measuring a magnetic write width in discrete track recording for writing data on a discrete track medium using a magnetic head.

2. Description of the Related Art

In order to satisfy demand for higher recording density of a magnetic recording and reproducing apparatus, particularly of a magnetic disk drive apparatus, it is requested to more improve performance of a thin-film magnetic head and a magnetic recording medium.

As for a thin-film magnetic head, a composite type thin-film magnetic head with a laminated structure of a magnetoresistive effect (MR) read head element and an electromagnetic transducer write head element is widely utilized. The electromagnetic transducer write head element now starts to adopt a perpendicular magnetic recording structure capable of providing finer recording bits on a magnetic recording medium.

On the contrary, as for a magnetic recording medium, a structure adapted for the above-mentioned perpendicular magnetic recording method, particularly a discrete track structure with tracks physically separated to each other is getting to attract attention. In general, each recording bit is composed of a plurality of fine magnetic particles. Therefore, in order to increase a recording density, it is necessary to reduce a diameter of the fine magnetic particles to minimize microscopic asperities on the boundary of the recording bits. However, if the diameter of the fine magnetic particles is reduced, thermal stability in magnetization of the recording bits will deteriorate due to the decreased volume of the fine magnetic particles. The aforementioned perpendicular magnetic recording structure can solve this problem of the thermal stability in magnetization.

When a size of the recording bit becomes small and therefore a width of the written track becomes narrow, magnetic interference from the neighboring tracks may increase. A discrete track medium has fine grooves for physically separating the neighboring tracks to each other to reduce possible magnetic interference. Thus, this discrete track medium can extremely increase the surface recording density. In fact, discrete tracks with a track pitch of 90 nm for example are realized by using an ultra micromachining process such as an electron-beam lithography process or a precise dry-etching process.

In discrete track recording (DTR) for writing data onto the discrete track medium by using a magnetic head, it is very important to precisely measure a magnetic write width of the magnetic head ($MWW_{HEAD}$) and a magnetic write width of the discrete track medium ($MWW_{MEDIUM}$) and to use the measured widths for designing a magnetic head and a discrete track medium with desired performance. The magnetic write width of the magnetic head $MWW_{HEAD}$ is different from a physical width of a write pole of the magnetic head but defined as a width of a write pole region within which a write magnetic field effectively operating on the medium is produced during actual write operation. Also, the magnetic write width of the discrete track medium $MWW_{MEDIUM}$ is different from a physical width of a track of the medium but defined as a width of a medium region in the track-width direction, within which a signal magnetic field read out by an MR read head element and contributed to an actual read output is produced.

Indeed, in a conventional magnetic recording medium, it is important to measure these magnetic write widths $MWW_{HEAD}$ and $MWW_{MEDIUM}$. For example, U.S. Pat. No. 6,680,609 B1 discloses a method of determining a magnetic track width of a conventional magnetic head with a magnetic read width MRW narrower than a magnetic write width $MWW_{HEAD}$ ($MRW<MWW_{HEAD}$). Also, U.S. Pat. No. 7,119,537 B2 discloses a method of directly measuring a magnetic read width MRW from the derivative of a full track profile and a method of obtaining a magnetic write width $MWW_{HEAD}$. Further, U.S. Pat. No. 6,608,477 B2 discloses a method of qualifying a head by producing a modified track scan data based on a difference between a magnetic write width $MWW_{HEAD}$ and a nominal track width. Still further, Japanese Patent Publication No. 2000-11336A discloses a magnetic disk apparatus with a relationship of $E \geq R \geq W$, where E is a signal erasing width of an electromagnetic transducer element, R is a reproducing track width of an MR head, and W is a signal recording width of the electromagnetic transducer element.

In the conventional head, it is designed to have a magnetic read width MRW narrower than a magnetic write width $MWW_{HEAD}$ ($MRW<MWW_{HEAD}$) as aforementioned. However, according to the discrete track recording (DTR) system, it is impossible to measure a magnetic write width of the discrete track medium $MWW_{MEDIUM}$ using this configuration of the conventional head.

Namely, according to the conventional magnetic recording system, since some off-track is allowed to shorten a seek time or to suppress runouts of the spindle motor, there exists background data that are data on non-overwritten area along both sides of the data track. In order to avoid reading of such background data and of data on the adjacent track, the conventional head is designed as $MRW<MWW_{HEAD}$.

Contrary to this, according to the DTR system, there exist grooves along both sides of the data track, for keeping a predetermined distance from the adjacent track, and therefore no background data exists on the medium. As a result, it is possible to design the DTR system to have a magnetic read width MRW wider than a magnetic write width $MWW_{HEAD}$ ($MRW>MWW_{HEAD}$), and in fact it is so implemented. If the magnetic read width MRW is widened, a height of a magnetic sensitive part of the MR element in a direction perpendicular to an air bearing surface (ABS) can be increased, so that the fabrication of the MR element becomes easy. Particularly, in case of a current perpendicular to plane type magnetic head, its element resistance can be reduced.

Zhong-Heng Lin, et al., "Full-Track Profile Derivative Method for Track Width Measurements of Magnetic Recording Head", IEEE TRANSACTIONS ON MAGNETICS, Vol. 41 No. 10, October 2005, pp.3067-3069 discloses that, when a magnetic recording system is designed to have a magnetic read width MRW wider than a magnetic write width $MWW_{HEAD}$ ($MRW>MWW_{HEAD}$), an error in measurement of $MWW_{HEAD}$ will increase depending upon the reduction of a true value of $MWW_{HEAD}$. The measured value $MWW_{HEAD}$ will converge to the MRW value when the true value of $MWW_{HEAD}$ decreases and thus the difference between the measured value and the true value of $MWW_{HEAD}$ will increase. It is possible to calculate a magnetic write width of the medium $MWW_{MEDIUM}$ even under the condition of $MRW>MWW_{HEAD}$, by using the method described in Zhong-Heng Lin, et al., "Full-Track Profile Derivative Method for Track Width Measurements of Magnetic Recording Head", IEEE TRANSACTIONS ON MAGNETICS, Vol.

41 No. 10, Oct. 2005, pp.3067-3069. However, due to the influence of possible distortion in the track profile, measurement of the magnetic write width $MWW_{HEAD}$ is quite difficult. In fact, under the condition of $MRW>MWW_{HEAD}$, since it is impossible for the read head element to provide its maximum output, a large error will occur in a value $MWW_{HEAD}$ calculated from the average track amplitude (TAA).

In general, on the discrete track medium, it is difficult to leave traces corresponding to $MWW_{HEAD}$. Therefore, due to the aforementioned facts, in the DTR system, it is extremely difficult to accurately measure a magnetic write width of the magnetic head $MWW_{HEAD}$ and a magnetic write width of the discrete track medium $MWW_{MEDIUM}$.

SUMMARY OF THE INVENTION

It is therefore an object of the present invention to provide a method of measuring a magnetic write width of a magnetic head $MWW_{HEAD}$ and a magnetic write width of a discrete track medium $MWW_{MEDIUM}$, which is insensitive to possible distortion in the track profile in discrete track recording (DTR).

Another object of the present invention is to provide a computer program product capable of implementing the above-mentioned measuring method.

Further object of the present invention is to provide a magnetic recording and reproducing apparatus capable of implementing the above-mentioned measuring method.

Before describing the present invention in detail, terms of "directions" used in this specification are defined. In embodiments of a magnetic head and magnetic recording medium according to the present invention, "X-axis, Y-axis and Z-axis directions" are used with reference to drawings. The X-axis direction means a direction along a track of the magnetic recording medium, the Y-axis direction means a track-width direction, and the Z-axis direction means a direction perpendicular to a medium surface of the magnetic recording medium.

According to the present invention, a method of measuring a magnetic write width includes a step of forming a data track on a discrete track medium by performing a write operation at a first frequency, using a write pole of a magnetic head, a step of performing, using the write pole, write operations at a second frequency that is different from the first frequency, at both side positions along the formed data track, the both side positions being separated from the center of the formed data track by a predetermined distance, a step of obtaining a track profile by scanning the data track in a track-width direction, using a magnetic field detection element, a step of calculating an integrated profile of the obtained track profile, a step of obtaining profile integrals by setting a distance from the data track to a position of the write operations at the second frequency to various values and by calculating the profile integrals for the respective values of the distance, and a step of calculating a magnetic write width of the magnetic head and a magnetic write width of the discrete track medium from a relationship between the distance and the profile integrals.

In the measuring method according to the present invention, in the discrete track medium, an integrated profile of the track profile is calculated, then a magnetic write width of a magnetic head $MWW_{HEAD}$ and a magnetic write width of a discrete track medium $MWW_{MEDIUM}$ are calculated from a relationship between distances of positions of the write operations at the second frequency and the profile integrals. As a result, $MWW_{HEAD}$ and $MWW_{MEDIUM}$ can be obtained without receiving the influence of possible distortion in the track profile in discrete track recording (DTR).

It is preferred that the magnetic write width calculating step includes obtaining the relationship between the distance and the profile integrals by sequentially decreasing the distance from the data track to the position of the write operations at the second frequency, determining, by using the obtained relationship, a first distance at which the profile integral starts to decrease from an initial value of the profile integral when the distance is decreased, determining, by using the obtained relationship, a second distance at which the profile integral becomes zero, determining the magnetic write width of the magnetic head by doubling the value of the determined second distance, and determining the magnetic write width of the discrete track medium by doubling a difference between the determined first distance and the determined second distance. In this case, more preferably, the magnetic write width calculating step includes calculating an approximate straight line using a least-square method for data points with the profile integrals larger than 0.05 times of the initial value of the profile integral and smaller than 0.95 times of the initial value of the profile integral, determining the first distance from a value of the distance at which the profile integral on the approximate straight line becomes the initial value of the profile integral, and determining the second distance from a value of the distance at which the profile integral becomes zero.

It is also preferred that the magnetic field detection element includes a magnetic field detection element with a magnetic read width greater than the magnetic write width of the magnetic head. Under this condition, $MWW_{HEAD}$ and $MWW_{MEDIUM}$ can be certainly measured. More preferably, the magnetic field detection element includes a read head element provided in the magnetic head for performing reading operations.

According to the present invention, also, a computer program product has a computer recording medium and computer instructions stored in the computer-recording medium. The computer instructions includes instructions for forming a data track on a discrete track medium by performing a write operation at a first frequency, using a write pole of a magnetic head, instructions for performing, using the write pole, write operations at a second frequency that is different from the first frequency, at both side positions along the formed data track, the both side positions being separated from the center of the formed data track by a predetermined distance, instructions for obtaining a track profile by scanning the data track in a track-width direction, using a magnetic field detection element, instructions for calculating an integrated profile of the obtained track profile, instructions for obtaining profile integrals by setting a distance from the data track to a position of the write operations at the second frequency to various values and by calculating the profile integrals for the respective values of the distance, and instructions for calculating a magnetic write width of the magnetic head and a magnetic write width of the discrete track medium from a relationship between the distance and the profile integrals.

It is preferred that the magnetic write width calculating instruction includes instructions for obtaining the relationship between the distance and the profile integrals by sequentially decreasing the distance from the data track to the position of the write operations at the second frequency, instructions for determining, by using the obtained relationship, a first distance at which the profile integral starts to decrease from an initial value of the profile integral when the distance is decreased, instructions for determining, by using the obtained relationship, a second distance at which the profile integral becomes zero, instructions for determining the magnetic write width of the magnetic head by doubling the value of the determined second distance, and instructions for determining the magnetic write width of the discrete track medium by doubling a difference between the determined first distance and the determined second distance. More preferably, the magnetic write width calculating instruction includes instructions for calculating an approximate straight line using a least-square method for data points with the profile integrals larger than 0.05 times of the initial value of the profile integral and smaller than 0.95 times of the initial value of the profile integral, instructions for determining the first distance from a value of the distance at which the profile integral on the approximate straight line becomes the initial value of the profile integral, and instructions for determining the second distance from a value of the distance at which the profile integral becomes zero.

According to the present invention, further, a magnetic recording and reproducing apparatus includes at least one discrete track medium, at least one magnetic head with a write pole for writing data onto the at least one discrete track medium and a read head element for reading data from the at least one discrete track medium, and a computer for controlling measurement of magnetic write width. The computer has a computer recording medium and computer instructions stored in the computer-recording medium. The computer instructions includes instructions for forming a data track on the at least one discrete track medium by performing a write operation at a first frequency, using the write pole of the at least one magnetic head, instructions for performing, using the write pole, write operations at a second frequency that is different from the first frequency, at both side positions along the formed data track, the both side positions being separated from the center of the formed data track by a predetermined distance, instructions for obtaining a track profile by scanning the data track in a track-width direction, using the read head element, instructions for calculating an integrated profile of the obtained track profile, instructions for obtaining profile integrals by setting a distance from the data track to a position of the write operations at the second frequency to various values and by calculating the profile integrals for the respective values of the distance, and instructions for calculating a magnetic write width of the at least one magnetic head and a magnetic write width of the at least one discrete track medium from a relationship between the distance and the profile integrals.

It is preferred that the magnetic write width calculating instruction includes instructions for obtaining the relationship between the distance and the profile integrals by sequentially decreasing the distance from the data track to the position of the write operations at the second frequency, instructions for determining, by using the obtained relationship, a first distance at which the profile integral starts to decrease from an initial value of the profile integral when the distance is decreased, instructions for determining, by using the obtained relationship, a second distance at which the profile integral becomes zero, instructions for determining the magnetic write width of the at least one magnetic head by doubling the value of the determined second distance, and instructions for determining the magnetic write width of the at least one discrete track medium by doubling a difference between the determined first distance and the determined second distance. More preferably, the magnetic write width calculating instruction includes instructions for calculating an approximate straight line using a least-square method for data points with the profile integrals larger than 0.05 times of the initial value of the profile integral and smaller than 0.95 times of the initial value of the profile integral, instructions for determining the first distance from a value of the distance at which the profile integral on the approximate straight line becomes the initial value of the profile integral, and instructions for determining the second distance from a value of the distance at which the profile integral becomes zero.

It is also preferred that a magnetic read width of the read head element is greater than the magnetic write width of the at least one magnetic head.

Further objects and advantages of the present invention will be apparent from the following description of the preferred embodiments of the invention as illustrated in the accompanying drawings. In the following drawings, the same component is indicated by the same reference numeral. In order to make easily understanding, the ratio in size of each component and between the components in the drawings is arbitrary.

DESCRIPTION OF THE PREFERRED EMBODIMENTS

Figure 1A:
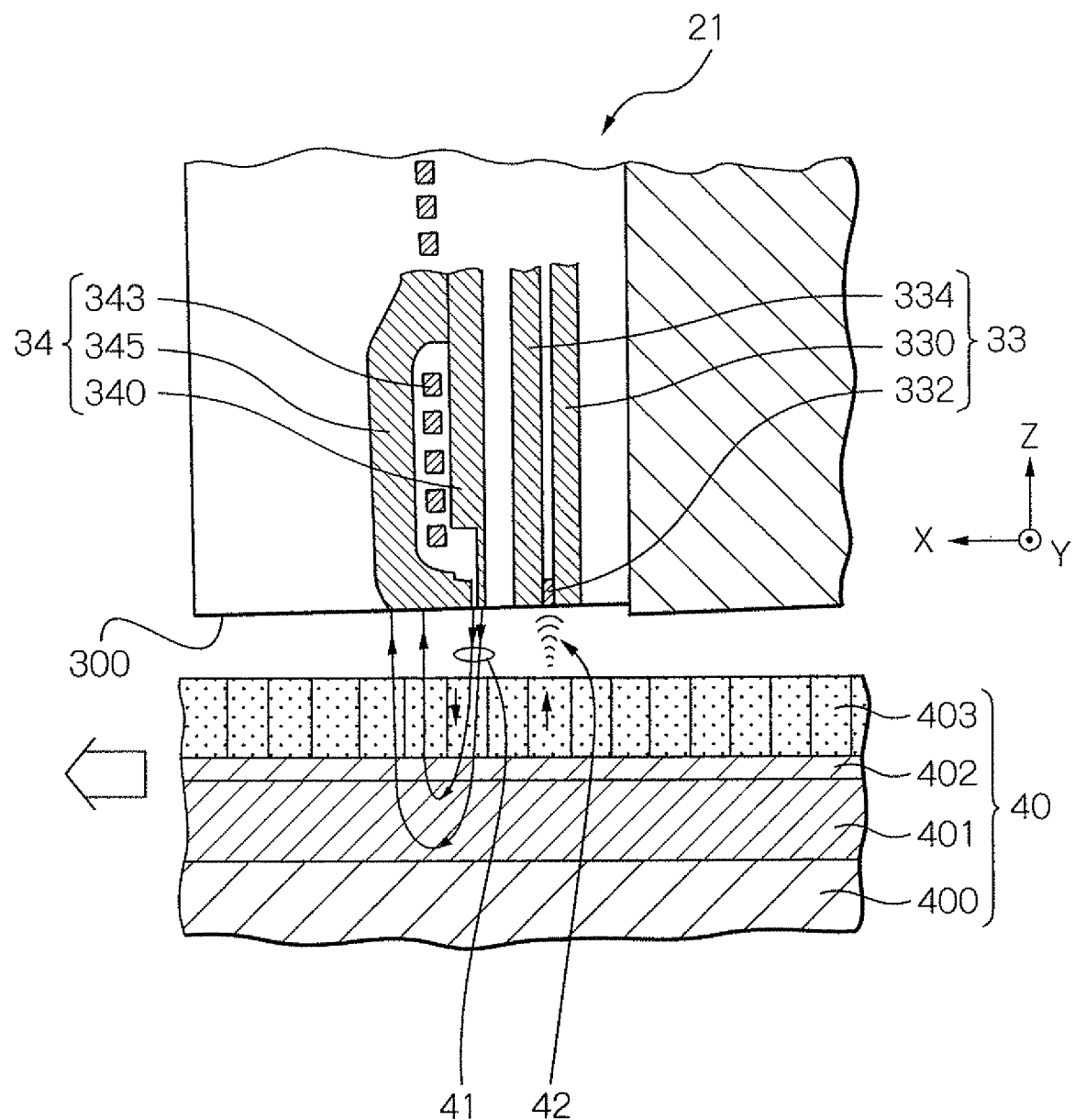
FIGS. 1a to 1c show schematic views illustrating a relationship between a magnetic write width of a magnetic head $MWW_{HEAD}$ and a magnetic read width of the magnetic head MRW on a discrete track medium.
Figure 1B:
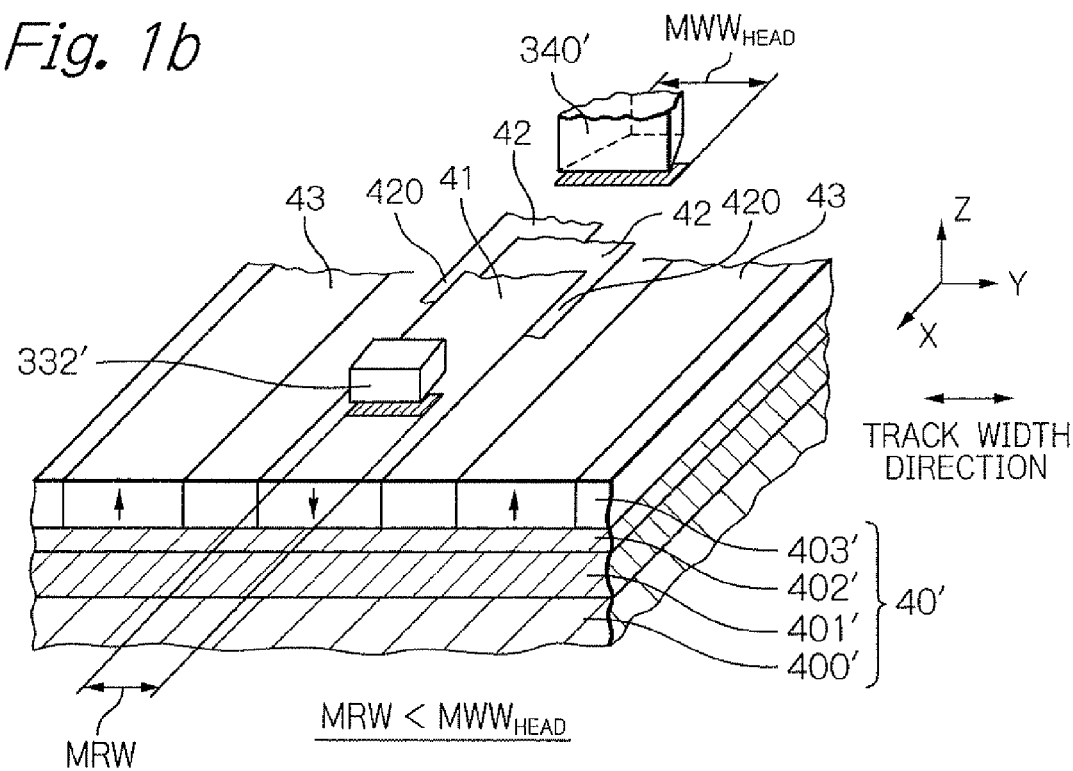
Figure 1C:
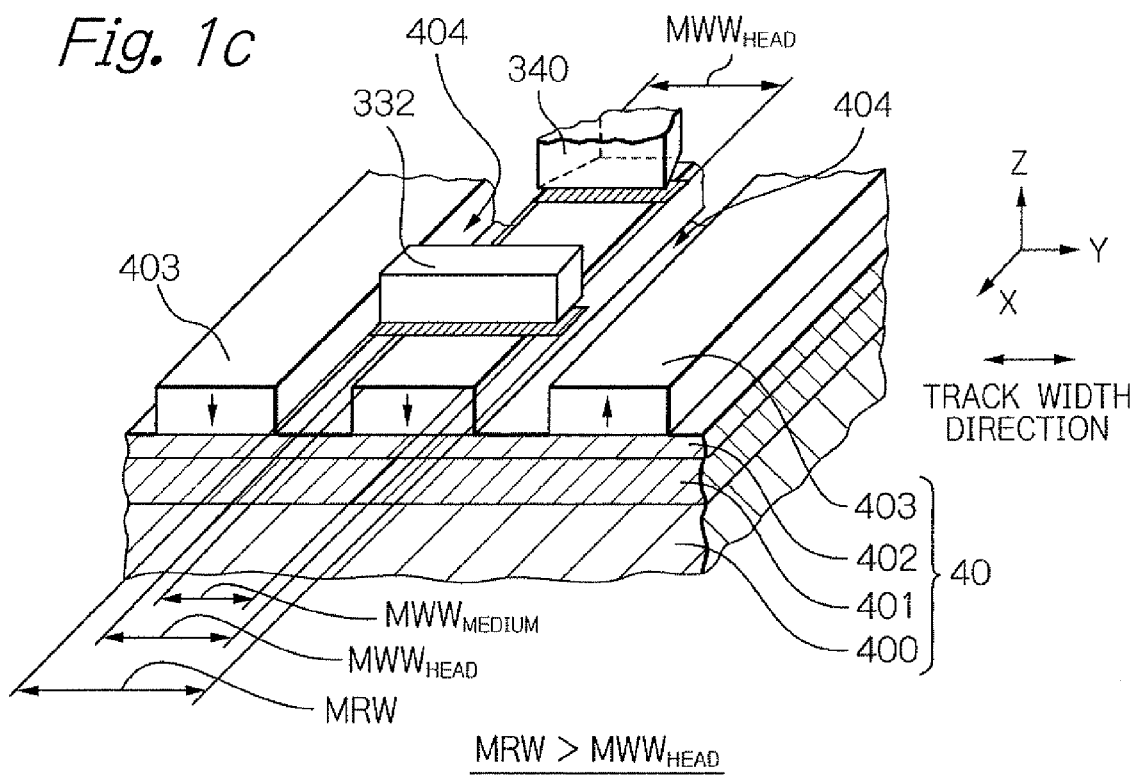

FIGS. 1a to 1c schematically illustrate a relationship between a magnetic write width of a magnetic head $MWW_{HEAD}$ and a magnetic read width of the magnetic head MRW on a discrete track medium.

As shown in FIG. 1a, a thin-film magnetic head 21 is provided with a magnetoresistive effect (MR) element 33 as a read head element used for data reading, and an electromagnetic transducer or inductive element 34 as a write head element used for data writing.

The MR element 33 has an MR multi-layered structure 332 that is a magnetic sensitive part for detecting signal magnetic field by utilizing tunnel magnetoresistive effect (TMR), current perpendicular to plane type giant magnetoresistive effect (CPP-GMR) or current in plane type giant magnetoresistive effect (CIP-GMR), and a lower shield layer 330 and an upper shield layer 334 formed to sandwich the MR multi-layered structure 332 there between. The MR multi-layered structure 332 has an end surface appeared to an air bearing surface (ABS) 300 of the head, for sensing a signal magnetic field 42 from a medium 40 to change its electrical resistance depending upon the signal magnetic field 42 so as to provide a read out voltage.

The electromagnetic transducer element 34 that is in this case a perpendicular magnetic recording type element has a main pole layer 340 operating as a write pole for producing write magnetic field, a write shield layer 345, and a write coil layer 343. The main pole layer 340 and the write shield layer 345 form a predetermined gap at the side of the ABS 300 and are connected to each other at the opposite side to the ABS 300. The write coil layer 343 has a spiral structure wound around a connection part of the main pole layer 340 and the write shield layer 345. Each turn of the write coil layer 343 passes through between the main pole layer 340 and the write shield layer 345. One end surface of the main pole layer 340 and the write shield layer 345 is appeared to the ABS 300 of the head. When a write current is fed through the write coil layer 343, a write magnetic field toward a medium 40 is produced from the main pole layer 340. In FIG. 1a, reference numeral 41 indicates a write magnetic flux corresponding to this write magnetic field.

The discrete track medium 40 is in this embodiment a magnetic disk for perpendicular magnetic recording. The medium 40 is configured by multi-layers of a soft magnetic backing layer 401 served as a part of a magnetic path for guiding the write magnetic flux 41, an intermediate layer 402 and a perpendicular magnetization layer 403 served as a magnetic recording layer, which are sequentially laminated on a substrate 400. The intermediate layer 402 also serves as an under layer for controlling particle diameter and orientation of crystal particles of the perpendicular magnetization layer 403. In modifications, a magnetic orientation layer for providing anisotropic magnetic field in the track-width direction to the soft magnetic backing layer 401 may be laminated under this backing layer 401.

The perpendicular magnetization layer 403 of the discrete track medium 40 configures as shown in FIG. 1c ridge-shaped discrete tracks. Such discrete tracks are fabricated by forming micro grooves 404 on a layer for the perpendicular magnetization layer 403. Forming of such discrete tracks physically separates adjacent tracks to each other and thus magnetic interference between the tracks can be reduced. As a result, the surface recording density can be extremely increased. In fact, using a microfabrication technique such as electro beam lithography or precise dry etching to realize a track pitch of 90 nm for example can form discrete tracks.

During write operation of the electromagnetic transducer element 34, as shown in FIG. 1a, the write magnetic flux 41 produced from the main pole layer 340 determines the magnetization direction of the perpendicular magnetization layer 403 to form a recording bit, returns at the soft magnetic backing layer 401, and then reaches the write shield layer 345. Contrary to this, during read operation of the MR element 33, the MR multi-layered structure 332 senses signal magnetic filed 42 from the medium 40. As is known, the discrete track medium 40 rotates that is moves toward the +X-axis direction during the writing and read operations.

Hereinafter, by using FIGS. 1b and 1c, relationships among a magnetic write width of the magnetic head $MWW_{HEAD}$, a magnetic read width of the magnetic head MRW, and a magnetic write width of the medium $MWW_{MEDIUM}$ in case of the conventional continuous medium 40' and the discrete track medium 40 will be described, respectively. The magnetic write width $MWW_{HEAD}$ of the thin-film magnetic head 21 is not the physical width of the main pole layer 340 of the head 21 in the track-width direction or the Y-axis direction but is defined as a width of a region of the main pole layer 340 in the track-width direction or the Y-axis direction, from which region a write magnetic field effectively acting on the medium 40 is produced during the actual write operation of the main pole layer 340. The magnetic read width MRW is defined as a width of a region of the MR multi-layered structure 332 in the track-width direction or the Y-axis direction, by which region the MR element 33 can effectively sense a signal magnetic field from the medium 40. Further, the magnetic write width $MWW_{MEDIUM}$ of the medium 40 is not the physical track width of the medium 40 but is defined as a width of a region of the medium 40 in the track-width direction or the Y-axis direction, from which region a signal magnetic field read by the MR element 33 to contribute an actual read output is produced.

First, described is a case in which a conventional continuous medium 40' not a discrete track medium is used. As shown in FIG. 1b, the continuous medium 40' is also configured by multi-layers of a soft magnetic backing layer 401', an intermediate layer 402' and a perpendicular magnetization layer 403', which are sequentially laminated on a substrate 400'. However, the perpendicular magnetization layer 403' has no groove but has a continuous surface.

In general, during the write operation using the electromagnetic transducer element, off-track of several percentages for example is actually allowed in order to shorten a seek time necessary for the head to move to a desired track. The off-track is allowed also to suppress runouts of the spindle motor. Therefore, a data track 41 may be formed at a position deviated from a previously written data track 42. As a result, background data 420 that is data written on a non-overwritten region appear along both sides of the data track 41. During the read operation using the MR element, however, it is necessary to avoid reading of this background data 420 and data on the adjacent tracks 43. Thus, the thin-film magnetic head is designed in general to have a magnetic read width MRW narrower than a magnetic write width $MWW_{HEAD}$ ($MRW<MWW_{HEAD}$).

Second, described is a discrete track recording (DTR) in which the discrete track medium 40 is used. As shown in FIG. 1c, the discrete track medium 40 has grooves 404 for keeping a space between perpendicular magnetization layers 403 that configure the discrete tracks at a predetermined distance. Therefore, even under the allowed off-track, no region in which background data may remain occurs. As a result, it is possible to design the head to have a magnetic read width MRW wider than a magnetic write width $MWW_{HEAD}$ ($MRW>MWW_{HEAD}$), and in fact it is so implemented. If the magnetic read width MRW is widened, a height of the multi-layered structure 332 of the MR element 33 in a direction perpendicular to the ABS 300 can be increased, so that the fabrication of the MR element becomes easy. Particularly, in case of a CPP type magnetic head, its element resistance can be reduced.

The magnetic write width $MWW_{HEAD}$ is designed so as to become wider than the magnetic write width $MWW_{MEDIUM}$ of the discrete track medium 40. Therefore, as a matter of course, the condition of $MRW>MWW_{MEDIUM}$ is held.

However, in case that the magnetic read width MRW is wider than the magnetic write width $MWW_{HEAD}$ ($MRW>MWW_{HEAD}$), the smaller of a true value of $MWW_{HEAD}$, the greater of a measured error of $MWW_{HEAD}$. According to the method described in Zhong-Heng Lin, et al., "Full-Track Profile Derivative Method for Track Width Measurements of Magnetic Recording Head", IEEE TRANSACTIONS ON MAGNETICS, Vol. 41 No. 10, October 2005, pp. 3067-3069, the measured value of $MWW_{HEAD}$ will converge on the value MRW with reducing of the true value of $MWW_{HEAD}$ to increase the difference between the measured value and the true value. Hereinafter, described is this point using FIG. 2.

Figure 2:
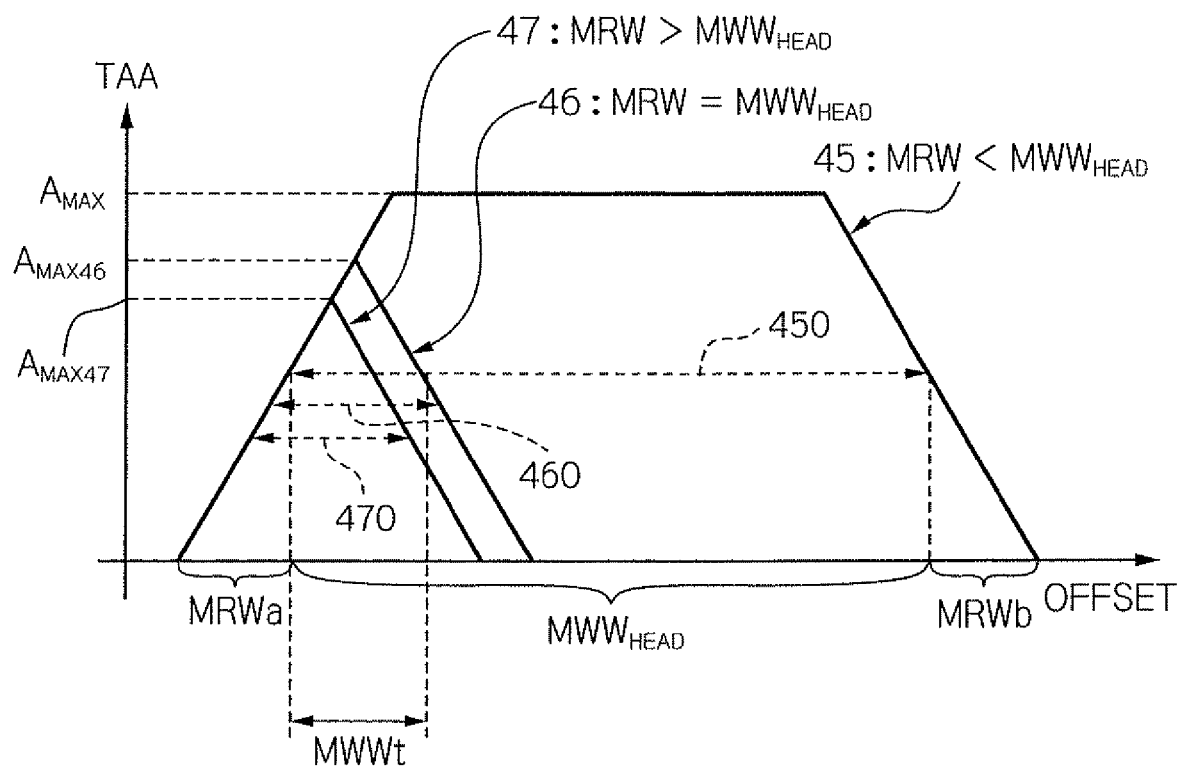
FIG. 2 shows a schematic view of track profiles illustrating reasons why a measured error of $MWW_{HEAD}$ increases in case of MRW>$MWW_{HEAD}$.

FIG. 2 schematically illustrates full track profiles for explaining reasons why the measured error of $MWW_{HEAD}$ increases in case of $MRW>MWW_{HEAD}$. In this graph of the full track profile, the lateral axis represents an offset value and the longitudinal axis represents a track average amplitude (TAA). For the sake of clarify, the full track profile is indicated by a trapezoidal or triangular shape enclosed with linear lines.

In FIG. 2, a full track profile 45 corresponds to a thin-film magnetic head designed as $MRW<MWW_{HEAD}$. According to the conventional art, $MWW_{HEAD}$ is determined from a measured value of a full width at half magnitude (FWHM) 450 in this full track profile 45. MRW is calculated from $MWW_{HEAD}$+MRW obtained by measuring, when the TAA is zero, a width of the full track profile 45, which corresponds to the base of the trapezoid. In the figure, it should be noted as MRW=MRWa+MRWb.

In FIG. 2, also, a full track profile 46 corresponds to a thin-film magnetic head designed as $MRW=MWW_{HEAD}$. In this case, a full width at half magnitude (FWHM) 460 will become greater than a true magnetic write width MWWt. This is because the maximum value $A_{MAX46}$ of the full track profile 46 falls short of the value $A_{MAX}$ that corresponds to the maximum output of the MR element causing distortion in the full track profile.

Further, in FIG. 2, a full track profile 47 corresponds to a thin-film magnetic head designed as $MRW>MWW_{HEAD}$. In this case, an error between a full width at half magnitude (FWHM) 470 and a true magnetic write width MWWt will become larger.

Hereinafter, a method of measuring a magnetic write width in a discrete track recording (DTR) designed as $MRW>MWW_{HEAD}$, according to the present invention, for resolving the aforementioned problems will be described.

Figure 3A:
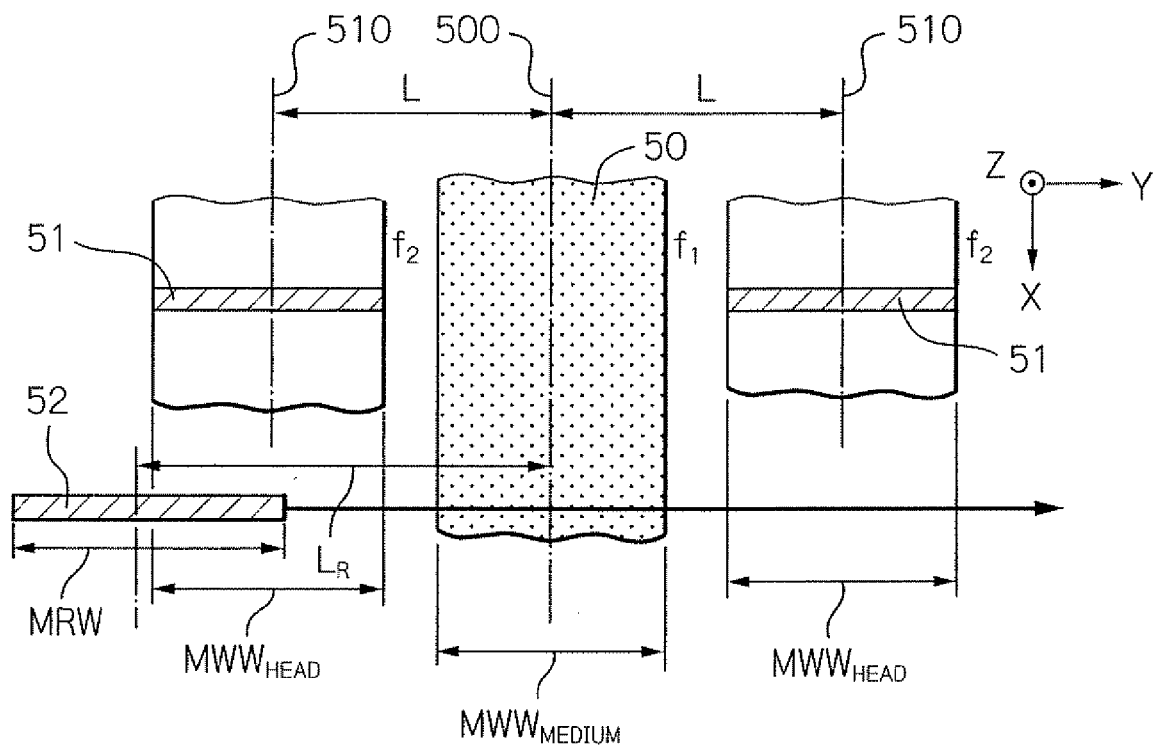
FIGS. 3a and 3b show a schematic view and a graph illustrating processes for obtaining the integral of the track profile in a method of measuring a magnetic write width according to the present invention.
Figure 3B:
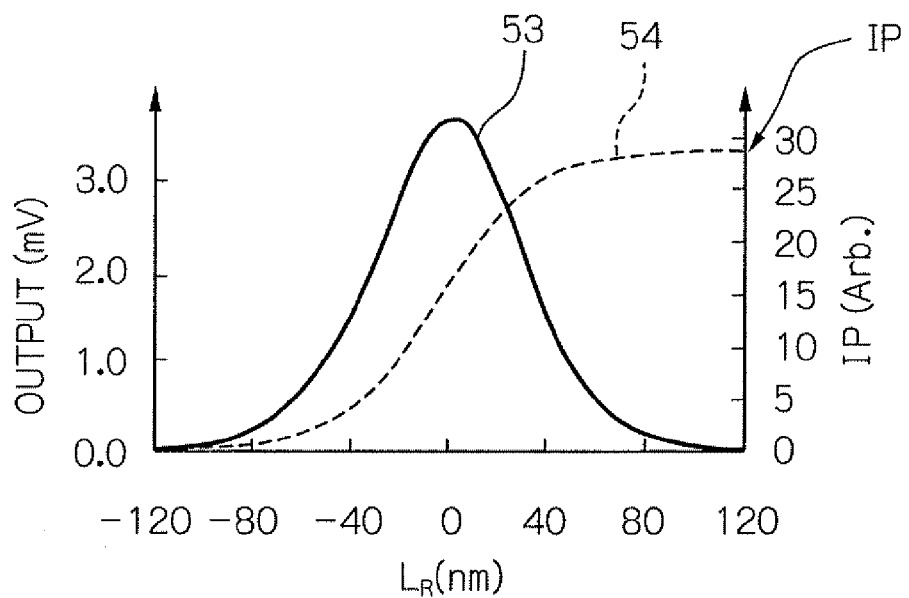
Figure 4:
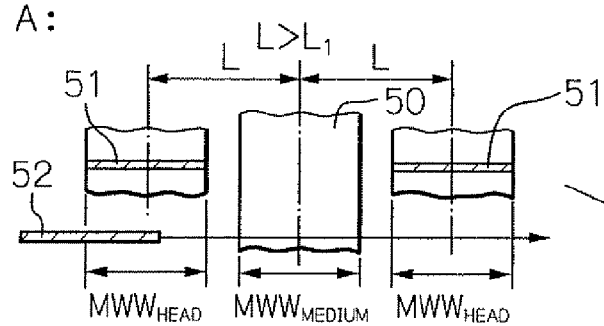
FIG. 4 shows schematic views and a graph illustrating processes for calculating a magnetic write width of the magnetic head $MWW_{HEAD}$ and a magnetic write width of the medium $MWW_{MEDIUM}$ from the obtained integral of the track profile in a method of measuring a magnetic write width according to the present invention.
Figure 4:
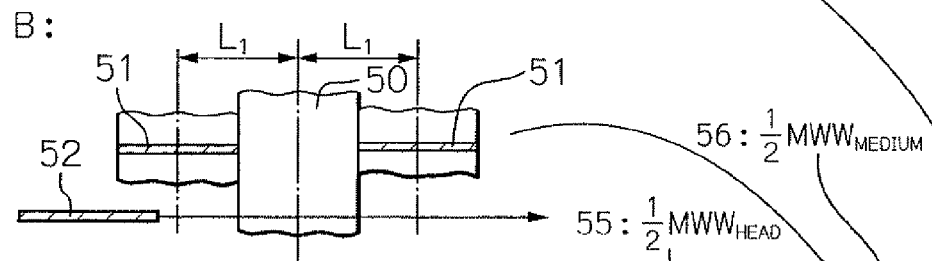
Figure 4:
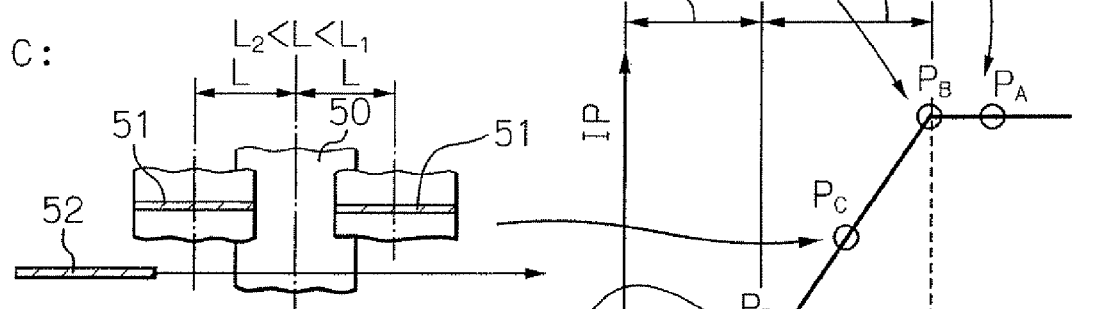
Figure 4:
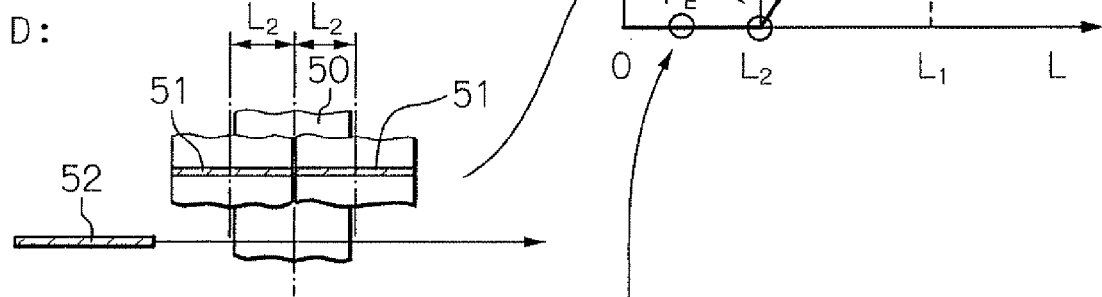
Figure 4:
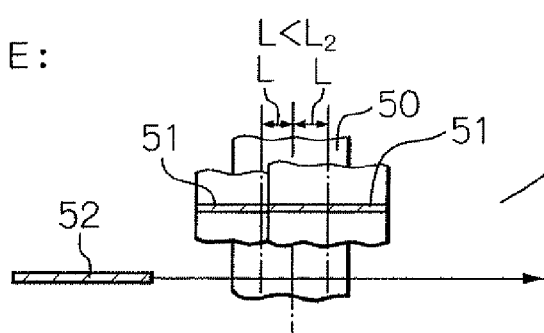

FIGS. 3a and 3b illustrate processes for obtaining the integral of the track profile in a method of measuring a magnetic write width according to the present invention, and FIG. 4 illustrates processes for calculating a magnetic write width of the magnetic head $MWW_{HEAD}$ and a magnetic write width of the medium $MWW_{MEDIUM}$ from the obtained integral of the track profile in a method of measuring a magnetic write width according to the present invention. It should be noted that the following method of measuring a magnetic write width can be implemented not only using a tester of electromagnetic conversion performance of head such as a spin stand but also in a magnetic recording and reproducing apparatus according to the present invention as will be described later with reference to FIG. 6.

As shown in FIG. 3a, at first, by using the main pole layer 340 of the thin-film magnetic head 21 (FIG. 1a), a write operation at a first frequency $f_1$ onto the discrete track medium 40 (FIG. 1c) is performed, and thus a data track 50 is formed. In FIG. 3a, the width of the data track 50 in the track-width direction or Y-axis direction is indicated to have the magnetic write width of the medium $MWW_{MEDIUM}$. In order to prevent reduction in read output due to influence of resolution, it is desired to determine the first frequency $f_1$ at a frequency of 12 T, that is 1/12 of the harmonic frequency. Then, by similarly using the main pole layer 340, a write operation at a second frequency $f_2$ onto areas 51 with the respective centers 510 separated by a predetermined distance L from the center 500 of the formed data track 50, in a direction along the formed data track 50 or in the x-axis direction, is performed. A width in the track-width direction or the Y-axis direction of each area 51 is indicated to have the magnetic write width of the head $MWW_{HEAD}$.

The distance form the data track 50 to the write operation area 51 is as aforementioned the distance L between the center 500 of the data track 50 and the center 510 of the area 51. This center 510 coincides with the center of the main pole layer 340 (FIG. 1a) during the write operation at the second frequency $f_2$. It is desired that the measured value L is greater than 0.5×(expected value of $MWW_{HEAD}$+expected value of $MWW_{MEDIUM}$). Also, it is desired that the second frequency $f_2$ be set to a value such as 2 T, which is different from the first frequency $f_1$.

Thereafter, a magnetic field detection element 52 scans the data track 50 in the track-width direction or the Y-axis direction, and thus a full track profile 53 at the first frequency $f_1$ shown in FIG. 3b is obtained. Desirably, the MR element 33 that is the MR multi-layered structure 332 (FIG. 1a) is used as the magnetic field detection element 52. In FIG. 3a, the width of the magnetic field detection element 52 in the track-width direction or the Y-axis direction is indicated to have the magnetic read width MRW ($>MWW_{HEAD}$). Measurement of the full track profile 53 at the first frequency $f_1$ is desirably performed within a narrow frequency band similar to that in a spectrum analyzer in order to reduce influence of noise.

Then, calculated is an integrated profile or integral characteristics 54 of the obtained full track profile 53. The integrated profile 54 is obtained by calculating a definite integral of the full track profile 53 up to a predetermined value of a position $L_R$ of the magnetic field detection element 52, and by representing a graph of a relationship between the calculated definite integral and the predetermined value of the position $L_R$. Then a profile integral IP of the full track profile 53 is calculated from the calculated integrated profile 54. The profile integral IP is the maximum value of the integrated profile 54 and corresponds to an area between the full track profile 53 and the lateral axis.

Then, full track profiles under various cases with different distances L are obtained and profile integrals IP in the respective cases are calculated. Then, based on these calculated results, a relationship between the distance L and the profile integral IP is illustrated. FIG. 4 shows a graph illustrating this relationship.

In the graph of FIG. 4, the lateral axis indicates the distance L, and the longitudinal axis indicates the profile integral IP. As shown in the figure, when the distance L decreases from a sufficiently large value, the profile integral IP starts to decrease from a maintained constant value or initial value at a first value $L_1$, and monotonously decreases to reach substantially zero at a second value $L_2$. The maintained constant value or initial value of the profile integral IP is the maximum value. In a graph obtained as a result of measurement, the first and second values $L_1$ and $L_2$ mat be not always definite. Therefore, first, for data points in the monotonously decreasing part of the profile integral IP and larger than 5% and smaller than 95% of the initial value of the profile integral IP, an approximate straight line is calculated using a least-square method. Then, an intersecting point of this approximate line and a line of IP=the initial value that is parallel to the L-axis is determined as a point of the first value $L_1$, and an intersecting point of the approximate line and a line of IP=zero or the L-axis is determined as a point of the second value $L_2$.

In the graph with the approximate line shown in FIG. 4, a point $P_A$ with a distance L of $L_1<L$ corresponds to a data point under the case A in which the write operation areas 51 of the second frequency $f_2$ completely separate from the data track 50. In this case A, the data track 50 of the first frequency $f_1$ is not overwritten at all. Therefore, the data output of the first frequency $f_1$ represents substantially the maximum value. A point $P_B$ with a distance L of $L=L_1$ corresponds to a data point under the case B in which one side edge of each write operation area 51 of the second frequency $f_2$ is superimposed over one side edge of the data track 50. A point $P_C$ with a distance L of $L_2<L<L_1$ corresponds to a data point under the case C in which the write operation areas 51 of the second frequency $f_2$ separate from each other and have portions superimposed over the data track 50. The shorter of the distance L, the wider of the regions of the data track 50 of the first frequency $f_1$ overwritten by the data of the second frequency $f_2$. A point $P_D$ with a distance L of $L=L_2$ corresponds to a data point under the case D in which one side edges of the write operation areas 51 of the second frequency $f_2$ are superimposed over each other in the data track 50. In this case D, the data track 50 of the first frequency $f_1$ is almost completely overwritten by the data of the second frequency $f_2$. A point $P_E$ with a distance L of $L<L_2$ corresponds to a data point under the case E in which the write operation areas 51 of the second frequency $f_2$ are partly superimposed over each other in the data track 50. In this case E, the data track 50 of the first frequency $f_1$ is completely overwritten by the data of the second frequency $f_2$ and therefore data output of the first frequency $f_1$ becomes zero.

As a result, in the graph shown in FIG. 4, a space 55 between the longitudinal axis of L=0 and a line of $L=L_2$, that is the value $L_2$, becomes a half of the width of the write operation area 51 of the second frequency $f_2$ or $0.5\times MWW_{HEAD}$. Also, a space 56 between the line of $L=L_2$ and a line of $L=L_1$, that is the value $(L_1-L_2)$, becomes a half of the width of the data track 50 or $0.5\times MWW_{MEDIUM}$. Thus, in the graph with the approximate line shown in FIG. 4, $MWW_{HEAD}$ can be obtained by calculating the space 55 and by doubling the calculated space. Also, $MWW_{MEDIUM}$ can be obtained by calculating the space 56 and by doubling the calculated space.

As mentioned in detail, according to the present invention, in the discrete track recording (DTR) under the condition of $MRW > MWW_{HEAD}$, it is possible to measure a magnetic write width $MWW_{HEAD}$ of the magnetic head and a magnetic write width $MWW_{MEDIUM}$ of the discrete track medium without being affected possible distortion in the track profile.

Figure 5:
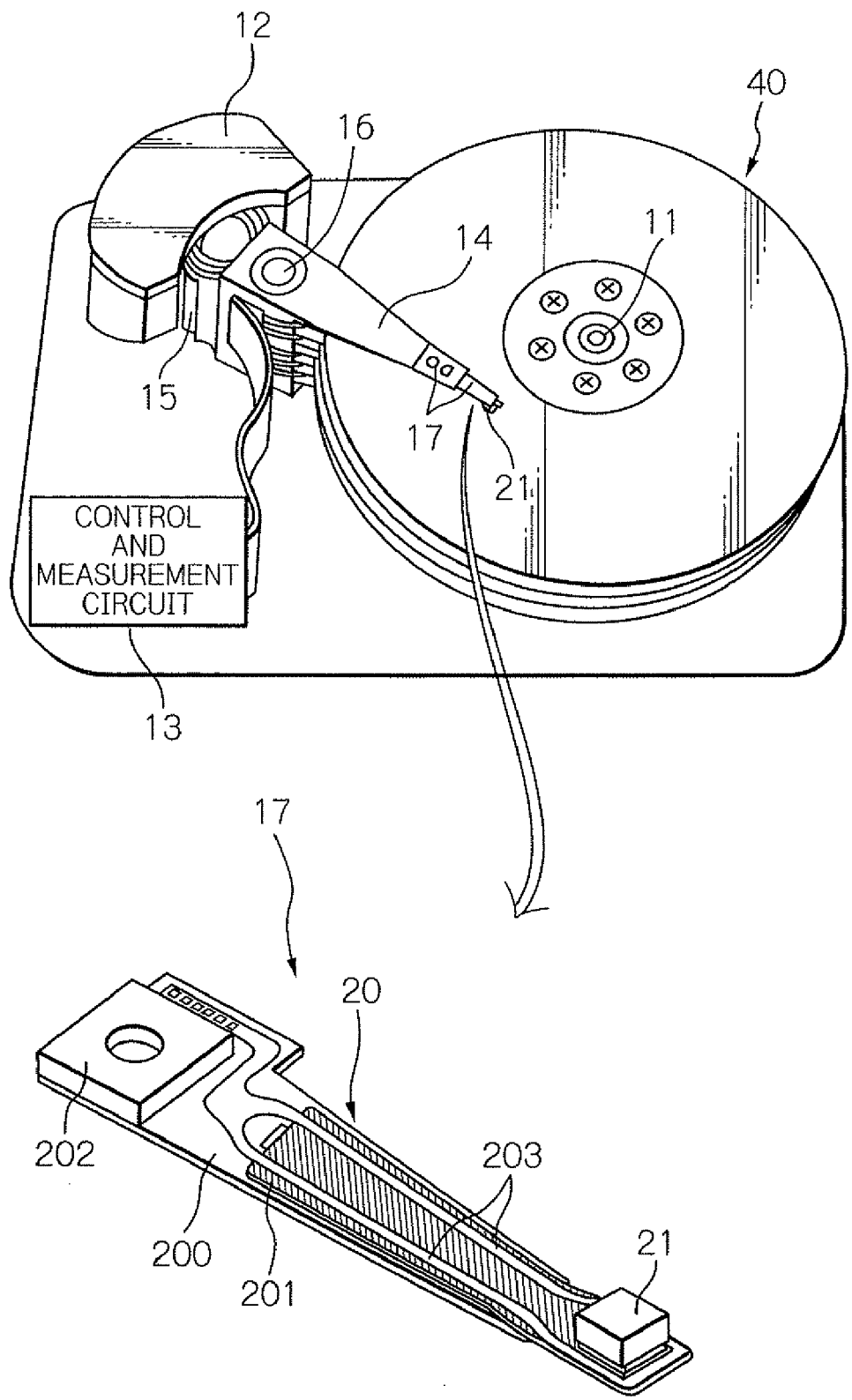
FIG. 5 shows a perspective view schematically illustrating a main portion of an embodiment of a magnetic recording and reproducing apparatus according to the present invention.

FIG. 5 schematically illustrates a main portion of an embodiment of a magnetic recording and reproducing apparatus and a head gimbal assembly (HGA) according to the present invention. In the figure, the surface of the HGA to be opposed to a magnetic recording medium surface faces up.

In this embodiment, a magnetic disk drive apparatus configures the magnetic recording and reproducing apparatus. In FIG. 5, reference numeral 40 denotes magnetic disks composed of a plurality of discrete track mediums rotating in operation around a rotation axis of a spindle motor 11, 12 denotes an assembly carriage mechanism for positioning the thin-film magnetic head 21 on the track, and 13 denotes a read/write control and write-width measurement circuit for controlling writing/read operations of the thin-film magnetic head 21 and for measuring $MWW_{HEAD}$ and $MWW_{MEDIUM}$, respectively. The assembly carriage mechanism 12 has a plurality of drive arms 14. These drive arms 14 are driven by a voice coil motor (VCM) 15 to swing about a pivot-bearing axis 16 and stacked along the axis 16. An HGA 17 is attache to a top end section of each drive arm 14.

The slider or thin-film magnetic head 21 is mounted on each HGA 17 to face the surface of each magnetic disk 40. The HGA 17 has the suspension 20, the thin-film magnetic head 21 fixed on the top end section of the suspension 20, and lead conductor member 203 with one end electrically connected to terminal electrodes of the thin-film magnetic head 21. The suspension 20 is provided with a load beam 200, a resilient flexure 201 fixed to and supported by the load beam 200, and a base plate 202 attached to the base of the load beam 200. The lead conductor member 203 is served to electrically connect the thin-film magnetic head 21 with the read/write control and write-width measurement circuit 13. The structure of the suspension of the HGA 17 according to the present invention is not limited to the aforementioned configuration but various structures may be adopted. Although it is not shown, an IC chip for driving the thin-film magnetic head may be mounted on the middle of the suspension 20. In modifications, the magnetic disk drive apparatus may have a single magnetic disk 40, a single drive arm 14, a single HGA 17 and a single thin-film magnetic 21.

Figure 6:
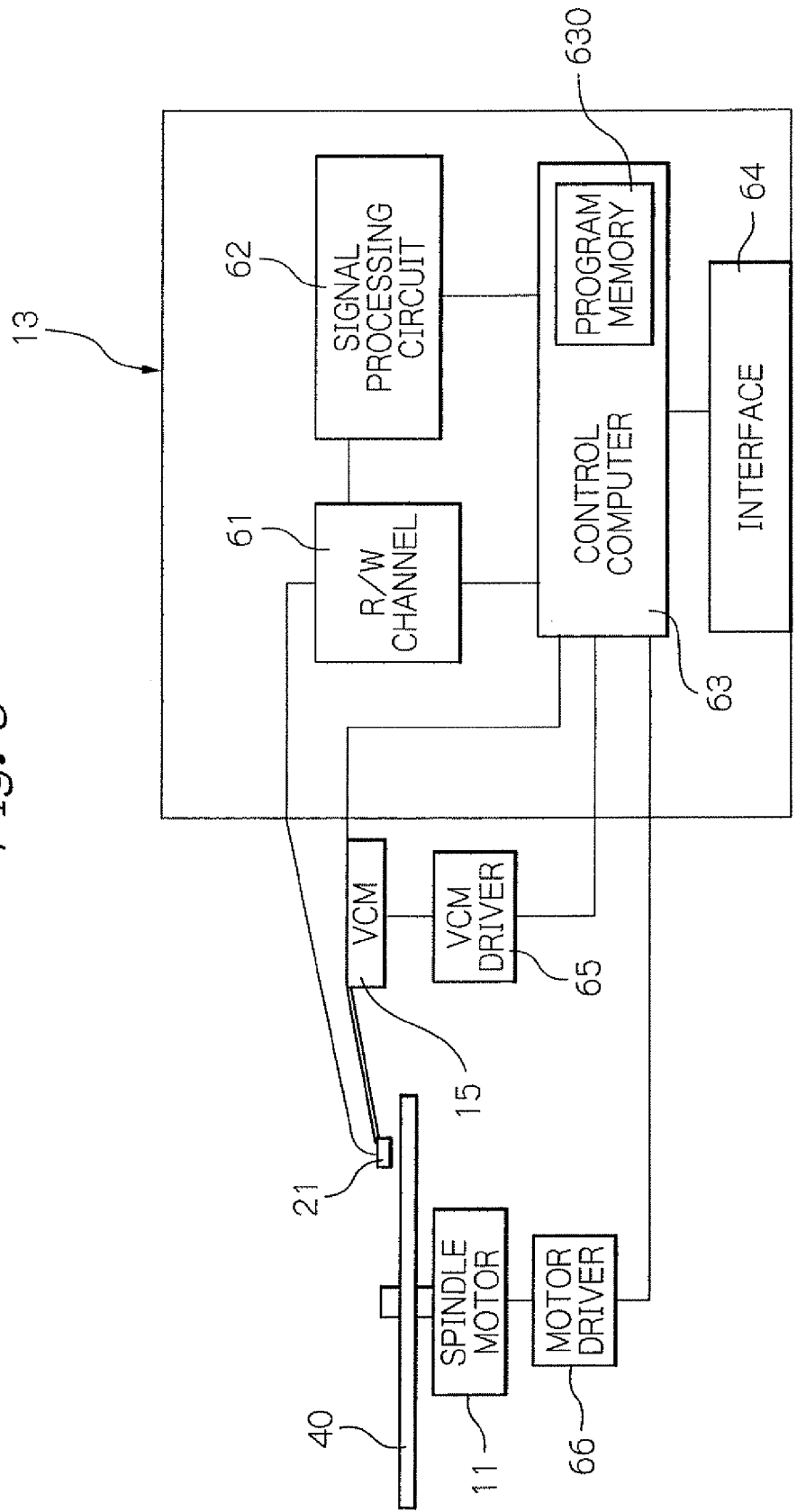
FIG. 6 shows a block diagram illustrating a circuit configuration of a read/write control and write width measurement circuit provided in the apparatus shown in FIG. 5.

FIG. 6 illustrates a circuit configuration of the read/write control and write width measurement circuit 13 provided in the apparatus shown in FIG. 5.

In FIG. 6, reference numeral 61 denotes a read/write (R/W) channel, 62 denotes a signal processing circuit for calculating $MWW_{HEAD}$ and $MWW_{MEDIUM}$ from the measured data of the full track profile, 63 denotes a control computer for controlling reading and write operations of the head 21, for controlling operations of obtaining the full track profile of the discrete track, and for controlling operations of the signal processing circuit 62, 64 denotes an interface, 65 denotes a VCM driver for driving the VCM 15, and 66 denotes a motor driver for driving the spindle motor 11, respectively. The read/write control and write width measurement circuit 13 has the R/W channel 61, the signal processing circuit 62, the control computer 63 and the interface 64 as shown in FIG. 6.

When obtaining a full track profile of the discrete track, the control computer 63 instructs the VCM driver 65 to drive the VCM 15 such that the MR element 33 in the head 21 scans the discrete track in the track-width direction, instructs the R/W channel 61 to feed the read output obtained by the MR element 33 to the signal processing circuit 63, and instructs the signal processing circuit 63 to calculate $MWW_{HEAD}$ and $MWW_{MEDIUM}$. The control computer 63 has a memory 630 as a computer recording medium in which program instructions for performing measurement of the magnetic write widths are stored. The calculated results of $MWW_{HEAD}$ and $MWW_{MEDIUM}$ may be fed to an external computer via the interface and may be evaluated in this external computer. The structure of the read/write control and write width measurement circuit 13 according to the present invention is not limited to the aforementioned configuration but various structures may be adopted.

Figure 7:
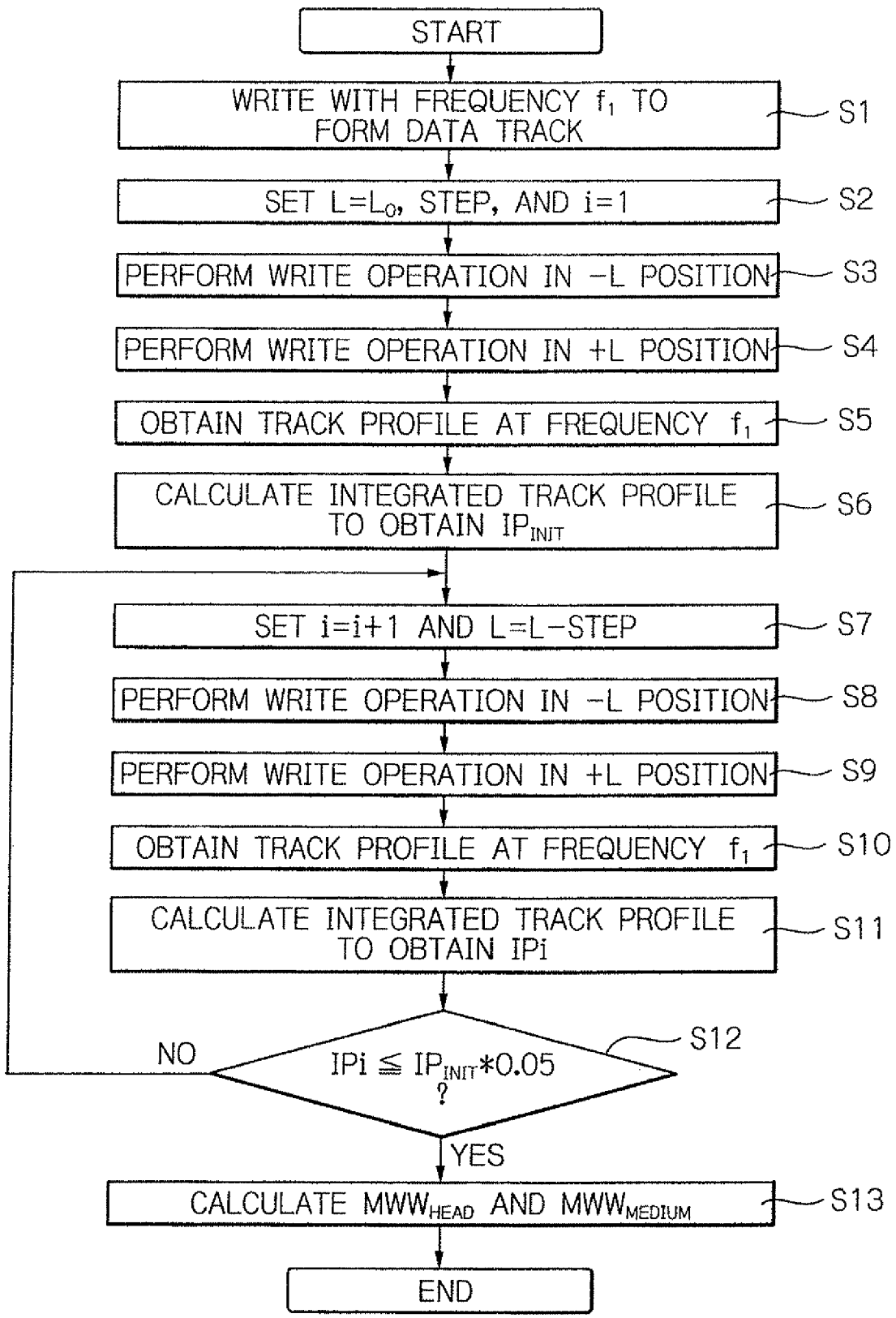
FIG. 7 shows a flow chart illustrating an embodiment of a program for implementing a method of measuring a magnetic write width according to the present invention.

FIG. 7 illustrates an embodiment of a program for implementing a method of measuring a magnetic write width according to the present invention. The control computer 63 shown in FIG. 6 for example runs this program to perform the measuring method.

In the method, first, a data write operation at the first frequency $f_1$ on the discrete track medium is performed to form a data track (Step S1). Then, a distance parameter L is set to an initial value ($L=L_0$), a step amount STEP is set to a predetermined value, and a step parameter i is set as i=1 (Step S2). It is desired that the initial value of the distance parameter $L_0$ is determined to a value greater than 0.5×(expected value of $MWW_{HEAD}$+expected value of $MWW_{MEDIUM}$). Then, a data write operation at the second frequency $f_2$ at a position of the distance parameter −L is performed (Step S3). Also, a data write operation at the second frequency $f_2$ at a position of the distance parameter +L is performed (Step S4). Thereafter, a full track profile of the first frequency $f_1$ is obtained (Step S5). Then, an integrated profile is calculated from the obtained full track profile and an initial profile integral $IP_{INIT}$ is calculated from the integrated profile (Step S6).

Thereafter, the step parameter i is incremented as i=i+1, and the distance parameter L is decreased as L=L−STEP (Step S7). Then, a data write operation at the second frequency $f_2$ at a position of the distance parameter −L is performed (Step S8). Also, a data write operation at the second frequency $f_2$ at a position of the distance parameter +L is performed (Step S9). Thereafter, a full track profile of the first frequency $f_1$ is obtained (Step S10). Then, an integrated profile is calculated from the obtained full track profile and a profile integral $IP_i$ at the STEP i is calculated from the integrated profile (Step S11).

Then, the calculated profile integral Ipi is compared with the initial profile integral $IP_{INIT}$ (Step S12). At the Step S12, concretely, whether the calculated profile integral Ipi is equal to or smaller than a threshold value, that is, 5 percent of the initial profile integral $IP_{INIT}$ is judged. If the profile integral Ipi is greater than 5% of the initial profile integral $IP_{INIT}$ (Ipi>$IP_{INIT}$×0.05), the program returns Step S7. Then, the incrementing of i at Step S7, the data write operations at the second frequency $f_2$ at Steps S8 and S9, measurement of the full track profile of the first frequency $f_1$ at Step S10, and calculation of the profile integral IPi at Step S11 are performed again. If the profile integral Ipi is equal to or smaller than 5% of the initial profile integral $IP_{INIT}$ (Ipi≦$IP_{INIT}$× 0.05), $MWW_{HEAD}$ and $MWW_{MEDIUM}$ are calculated from a profile of the profile integral Ipi obtained until that time (Step S13). The threshold value at Step S12 is not limited to 5% of the initial profile integral $IP_{INIT}$ but a value capable of determining a condition in which the data track of the first frequency $f_1$ is completely overwritten by data of the second frequency $f_2$ may be used as the threshold value.

EXAMPLE

Hereinafter, an example of the method of measuring a magnetic write width according to the present invention will be described.

Measurement of a magnetic write width was performed using a hard disk test system E5023A of Agilent Technologies. A discrete track medium 40 for perpendicular magnetic recording was used as a magnetic disk. An optical track width of the medium 40 optically measured was 73 nm. A track pitch of the medium 40 was 110 nm. A width in the track-width direction at the end section of the main pole layer 340 of the thin-film magnetic head 21 was 65 nm, and a width in the track-width direction of the MR multi-layered structure 332 was 68 nm. Therefore, MRW>$MWW_{HEAD}$ was realized.

Conditions for measurement were as follows: a rotation speed of the discrete track medium 40 was 5,400 rpm, a radius from the center of the data track was 21 mm, the maximum frequency 1 T of the write data was 360 MHz, and a write current was 30 $mA_{0-P}$. A space between the head 21 and the medium 40 was 3 nm, and STEP of the distance L (Step S2 of FIG. 7), that is a step of the distance L in the full track profile was 10 nm.

Figure 8:
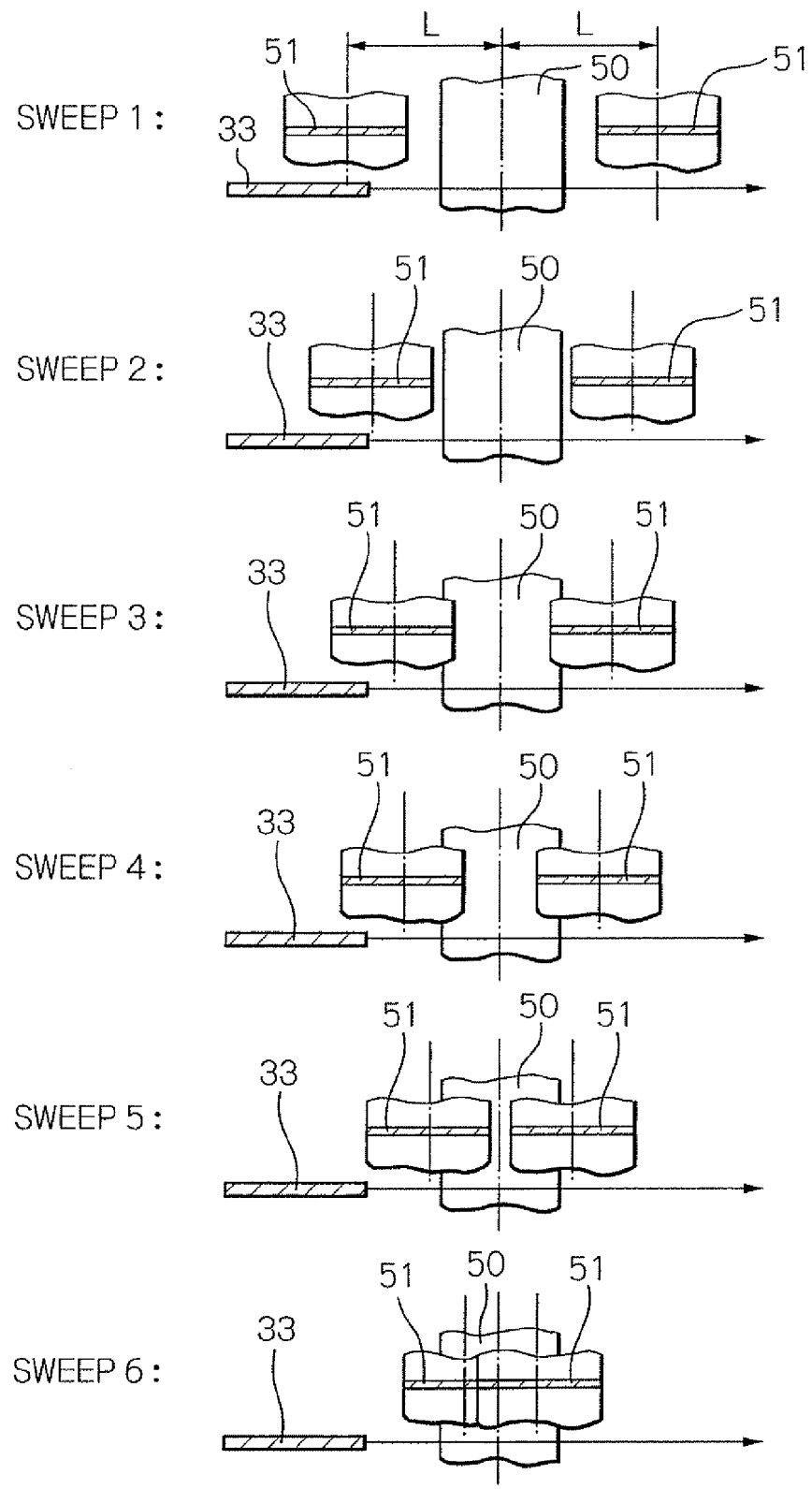
FIG. 8 shows schematic views illustrating a position of write operation at a second frequency with respect to a data track, in an example of a method of measuring a magnetic write width according to the present invention.

FIG. 8 schematically illustrates positions 51 of write operations at the second frequency with respect to a data track 50, in the example of a method of measuring a magnetic write width according to the present invention.

As shown in FIG. 8, in the example, the write operation at the second frequency and scanning by means of the MR element 33 were performed in 6 patterns of sweeps 1 to 6. As will be noted from FIG. 8, from the sweep 1 to the sweep 6, the distance L of the positions at which the write operations at the second frequency were performed sequentially decreases in this order. In the sweeps 1 and 2, the positions 51 of the write operation at the second frequency $f_2$ were separated from the data track 50. In the sweeps 3 to 5, the positions 51 were separated with each other but had portions superimposed over the data track 50. In the sweep 6, the positions 51 had portions superimposed with each other. Full track profiles T1 to T6 were measured by scanning these sweeps 1 to 6 using the MR element 33.

Figure 9A:
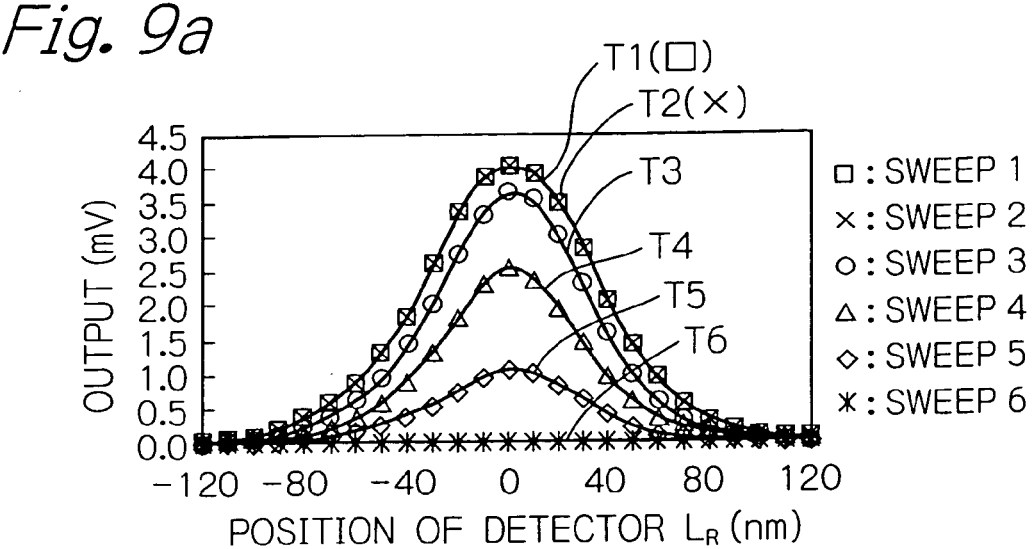
FIG. 9a shows a graph illustrating full track profiles T1 to T6 measured in sweeps 1 to 6.

FIG. 9a illustrates the full track profiles T1 to T6 measured in the sweeps 1 to 6. In this figure, the lateral axis indicates a position $L_R$ of the MR element 33, and the longitudinal axis indicates an output of the MR element 33.

As shown in the figure, the maximum values in the sweeps 1 and 2 are substantially equal to each other. The maximum values in the sweeps 3 to 6 are not equal but become sequentially small from the sweep 3 to the sweep 6. The maximum value in the sweep 6 is almost zero. Then, with respect to these full track profiles T1 to T6, integrated profiles I1 to I6 were obtained, respectively. Then, profile integrals IP1 to IP6 were calculated for the integrated profiles I1 to I6, respectively.

Figure 9B:
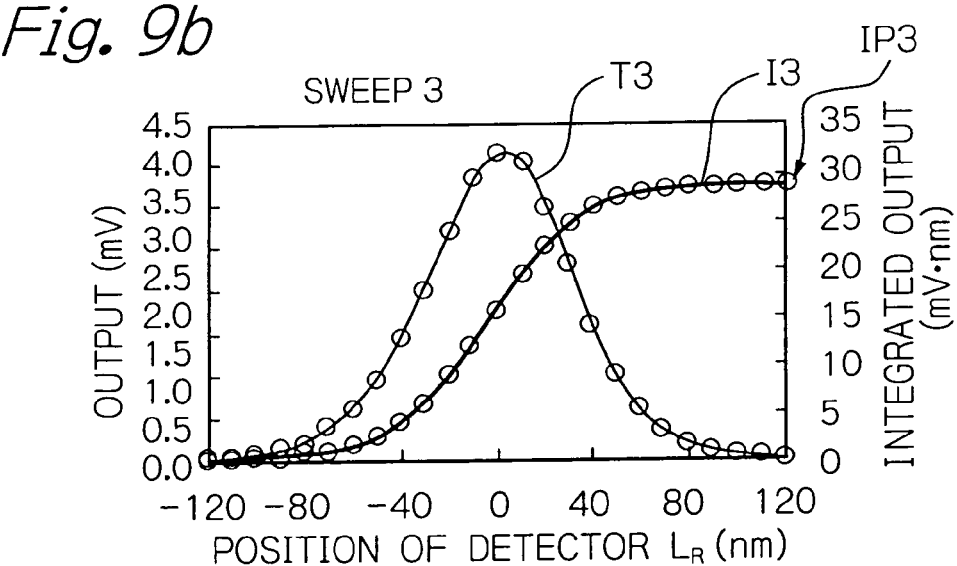
FIG. 9b shows a graph illustrating an example of the obtained integrated profile or obtained integral characteristics of profile I3 for the full track profile T3.
Figure 9C:
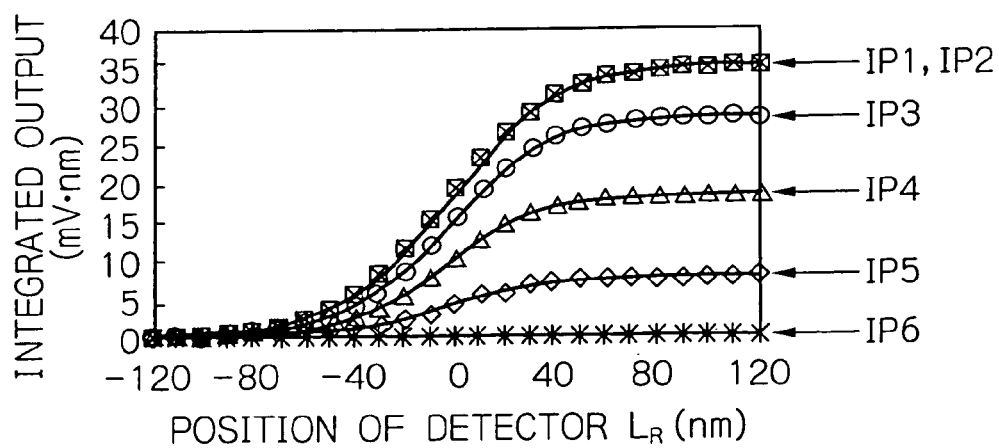
FIG. 9c shows a graph illustrating the obtained integrated profiles or obtained integral characteristics of profiles I1 to I6.

FIG. 9b illustrates an example of the obtained integrated profile I3 for the full track profile T3, and FIG. 9c illustrates the obtained integrated profiles I1 to I6.

As shown in FIG. 9b, the integrated profile I3 is obtained by calculating the definite integral of the full track profile T3 until a predetermined point of the position $L_R$ of the MR element 33, and by indicating a relationship between the calculated definite integral and the predetermined point of the position $L_R$ in a graph for example. In FIG. 9b, the right side longitudinal axis indicates an integrated output of the integrated profile I3 in units of (mV×nm) but illustrated in arbitrary scale. The profile integral IP3 of the full track profile T3 was calculated from the integrated profile I3. The profile integral IP3 is the maximum value of the integrated profile I3 and corresponds to an area between the full track profile T3 and the lateral axis.

As shown in FIG. 9c, the profile integrals IP1 and IP2 are substantially equal to each other. The profile integrals IP3 to IP6 are not equal but become sequentially small from the profile integral IP3 to the profile integral IP6. The profile integral IP6 is almost zero. The values $MWW_{HEAD}$ and $MWW_{MEDIUM}$ were calculated from the relationship of the distance L and the profile integral IP. Table 1 shows the obtained distance L and profile integral IP with respect to Sweeps 1 to 6.

TABLE 1

| | Sweep | | | | | |
|---|---|---|---|---|---|---|
| | 1 | 2 | 3 | 4 | 5 | 6 |
| Distance L (nm) | 85 | 75 | 65 | 55 | 45 | 35 |
| Profile Integral IP (mV × nm) | IP1 = 35.6 | IP2 = 35.6 | IP3 = 28.7 | IP4 = 18.7 | IP5 = 7.87 | IP6 = 0.25 |

Figure 10:
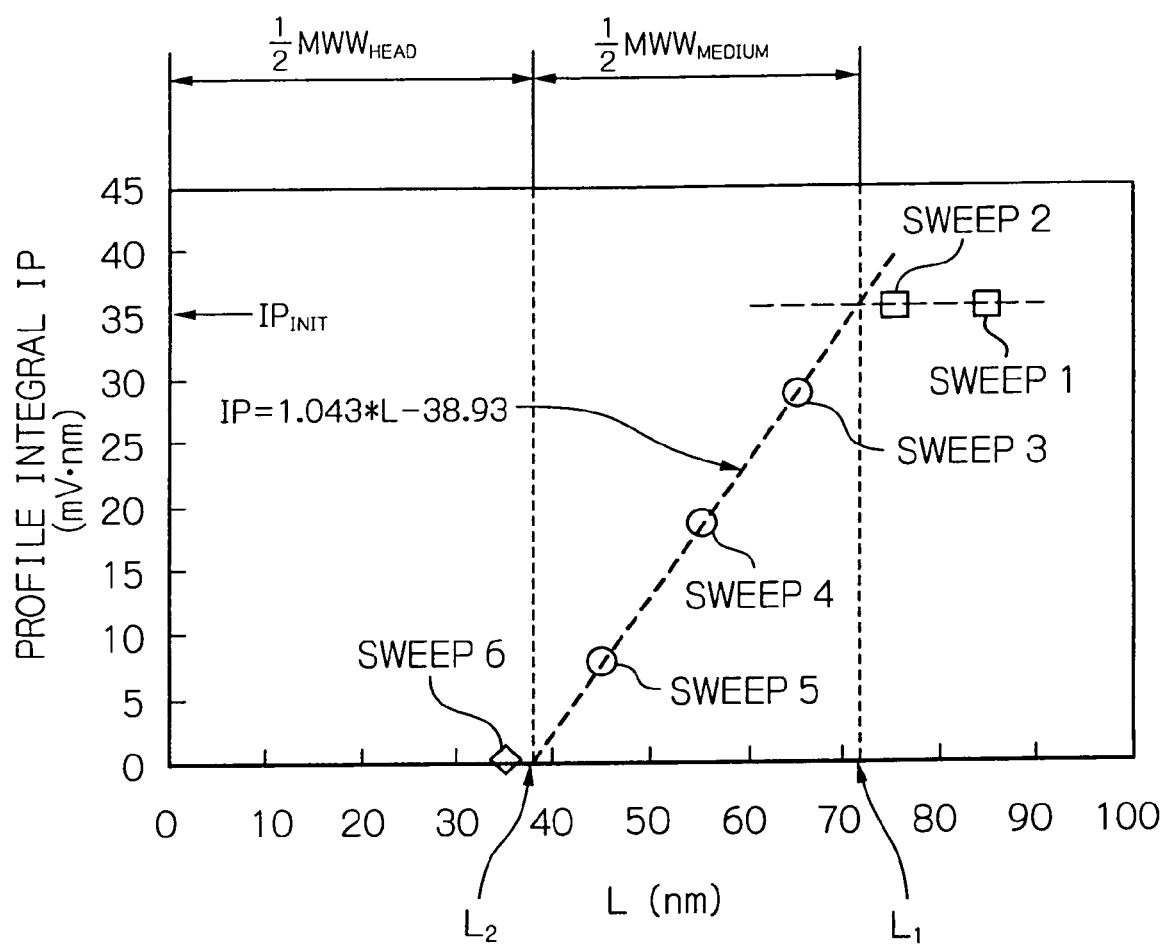
FIG. 10 shows a graph illustrating a relationship between distance L and a profile integral IP, which is shown in Table 1, used for calculating values $MWW_{HEAD}$ and $MWW_{MEDIUM}$.

FIG. 10 illustrates the relationship between the distance L and the profile integral IP, shown in Table 1, used for calculating values $MWW_{HEAD}$ and $MWW_{MEDIUM}$. In the figure, the lateral axis indicates the distance or position L at which the write operation at the second frequency was performed, and the longitudinal axis indicates the calculated profile integral IP.

In FIG. 10, the profile integral IP1 (sweep 1) was determined as the initial profile integral $IP_{INIT}$. This initial profile integral $IP_{INIT}$ is the maximum value of the profile integral IP. The profile integral IP2 (sweep 2) was equal to the profile integral IP1, that is, equal to or greater than 95% of the initial profile integral $IP_{INIT}$ ($IP_{INIT} \times 0.95$). Contrary to this, all of the profile integrals IP3 to IP5 (sweeps 3 to 5) were smaller than $IP_{INIT} \times 0.95$ but greater than $IP_{INIT} \times 0.05$. Namely, $IP_{INIT} \times 0.05 <$ IP3, IP4, IP5 $< IP_{INIT} \times 0.95$. The profile integral IP6 (sweep 6) was equal to or smaller than $IP_{INIT} \times 0.05$. Then, for data points (sweep 3 to 5) with the profile integrals IP3 to IP5 within a range smaller than $IP_{INIT} \times 0.95$ but greater than $IP_{INIT} \times 0.05$, an approximate straight line was calculated using a least-square method. As a result, the approximate straight line of $$IP = 1.043 \times L - 38.93 \quad (1)$$

was obtained.

Then, a distance of an intersecting point of this approximate straight line (1) and a line of $IP = IP_{INIT}$ that is parallel to the L-axis was determined as a first value $L_1$, and $L_1 = 71.48$ nm was obtained. Also, a distance of an intersecting point of this approximate straight line (1) and a line of IP=zero or the L-axis was determined as a second value $L_2$, and $L_2 = 37.33$ was obtained.

Finally, from these first and second values, $$MWW_{HEAD} = 2 \times L_2 = 74.7 \text{ nm} \quad (2)$$

$$MWW_{MEDIUM} = 2 \times (L_1 - L_2) = 68.3 \text{ nm} \quad (3)$$

were calculated. Therefore, both a value of the magnetic write width $MWW_{HEAD}$ of the thin-film magnetic head and a value of the magnetic write width $MWW_{MEDIUM}$ of the discrete track medium could be obtained.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method of measuring a magnetic write width, comprising the steps of:

forming a data track on a discrete track medium by performing a write operation at a first frequency, using a write pole of a magnetic head;

performing, using said write pole, write operations at a second frequency that is different from said first frequency, at both side positions along the formed data track, said both side positions being separated from the center of the formed data track by a predetermined distance;

obtaining a track profile by scanning said data track in a track-width direction, using a magnetic field detection element;

calculating an integrated profile of the obtained track profile;

obtaining profile integrals by setting a distance from said data track to a position of the write operations at the second frequency to various values and by calculating the profile integrals for the respective values of the distance; and calculating a magnetic write width of said magnetic head and a magnetic write width of said discrete track medium from a relationship between said distance and said profile integrals.

2. The method as claimed in claim 1, wherein the magnetic write width calculating step comprises;

obtaining the relationship between said distance and said profile integrals by sequentially decreasing the distance from said data track to the position of the write operations at the second frequency, determining, by using the obtained relationship, a first distance at which the profile integral starts to decrease from an initial value of the profile integral when the distance is decreased, determining, by using the obtained relationship, a second distance at which the profile integral becomes zero, determining the magnetic write width of said magnetic head by doubling the value of the determined second distance, and determining the magnetic write width of said discrete track medium by doubling a difference between the determined first distance and the determined second distance.

3. The method as claimed in claim 2, wherein the magnetic write width calculating step comprises;

calculating an approximate straight line using a least-square method for data points with the profile integrals larger than 0.05 times of the initial value of the profile integral and smaller than 0.95 times of the initial value of the profile integral, determining the first distance from a value of the distance at which the profile integral on said approximate straight line becomes the initial value of the profile integral, and determining the second distance from a value of the distance at which the profile integral becomes zero.

4. The method as claimed in claim 1, wherein said magnetic field detection element comprises a magnetic field detection element with a magnetic read width greater than the magnetic write width of said magnetic head.

5. The method as claimed in claim 4, wherein said magnetic field detection element comprises a read head element provided in said magnetic head for performing reading operations.

6. A non-transitory computer readable medium storing a computer readable program executable by a computer for causing the computer to execute:

forming a data track on a discrete track medium by performing a write operation at a first frequency, using a write pole of a magnetic head;

performing, using said write pole, write operations at a second frequency that is different from said first frequency, at both side positions along the formed data track, said both side positions being separated from the center of the formed data track by a predetermined distance;

obtaining a track profile by scanning said data track in a track-width direction, using a magnetic field detection element;

calculating an integrated profile of the obtained track profile;

obtaining profile integrals by setting a distance from said data track to a position of the write operations at the second frequency to various values and by calculating the profile integrals for the respective values of the distance; and calculating a magnetic write width of said magnetic head and a magnetic write width of said discrete track medium from a relationship between said distance and said profile integrals.

7. The non-transitory computer readable medium according to claim 6, wherein the stored computer readable program further causes the computer to execute:

obtaining the relationship between said distance and said profile integrals by sequentially decreasing the distance from said data track to the position of the write operations at the second frequency, determining, by using the obtained relationship, a first distance at which the profile integral starts to decrease from an initial value of the profile integral when the distance is decreased, determining, by using the obtained relationship, a second distance at which the profile integral becomes zero, determining the magnetic write width of said magnetic head by doubling the value of the determined second distance, and determining the magnetic write width of said discrete track medium by doubling a difference between the determined first distance and the determined second distance.

8. The non-transitory computer readable medium according to claim 7, wherein the stored computer readable program further causes the computer to execute:

calculating an approximate straight line using a least-square method for data points with the profile integrals larger than 0.05 times of the initial value of the profile integral and smaller than 0.95 times of the initial value of the profile integral, determining the first distance from a value of the distance at which the profile integral on said approximate straight line becomes the initial value of the profile integral, and determining the second distance from a value of the distance at which the profile integral becomes zero.

9. A magnetic recording and reproducing apparatus including at least one discrete track medium, at least one magnetic head with a write pole for writing data onto said at least one discrete track medium and a read head element for reading data from said at least one discrete track medium, and a computer for controlling measurement of magnetic write width, said computer having a non-transitory computer readable medium storing a computer readable program executable by the computer for causing the computer to execute:

forming a data track on said at least one discrete track medium by performing a write operation at a first frequency, using said write pole of said at least one magnetic head;

performing, using said write pole, write operations at a second frequency that is different from said first frequency, at both side positions along the formed data track, said both side positions being separated from the center of the formed data track by a predetermined distance;

obtaining a track profile by scanning said data track in a track-width direction, using said read head element;

calculating an integrated profile of the obtained track profile;

obtaining profile integrals by setting a distance from said data track to a position of the write operations at the second frequency to various values and by calculating the profile integrals for the respective values of the distance; and calculating a magnetic write width of said at least one magnetic head and a magnetic write width of said at least one discrete track medium from a relationship between said distance and said profile integrals.

10. The apparatus as claimed in claim 9, wherein the stored computer readable program further causes the computer to execute:

obtaining the relationship between said distance and said profile integrals by sequentially decreasing the distance from said data track to the position of the write operations at the second frequency, determining, by using the obtained relationship, a first distance at which the profile integral starts to decrease from an initial value of the profile integral when the distance is decreased, determining, by using the obtained relationship, a second distance at which the profile integral becomes zero, determining the magnetic write width of said at least one magnetic head by doubling the value of the determined second distance, and determining the magnetic write width of said at least one discrete track medium by doubling a difference between the determined first distance and the determined second distance.

11. The apparatus as claimed in claim 10, wherein the stored computer readable program further causes the computer to execute:

calculating an approximate straight line using a least-square method for data points with the profile integrals larger than 0.05 times of the initial value of the profile integral and smaller than 0.95 times of the initial value of the profile integral, determining the first distance from a value of the distance at which the profile integral on said approximate straight line becomes the initial value of the profile integral, and determining the second distance from a value of the distance at which the profile integral becomes zero.

12. The apparatus as claimed in claim 9, wherein a magnetic read width of said read head element is greater than the magnetic write width of said at least one magnetic head.

* * * * *